Patented Mar. 1, 1927.

1,619,758

UNITED STATES PATENT OFFICE.

CHARLES F. PETERSON, OF SCOTIA, NEW YORK, ASSIGNOR TO GENERAL ELECTRIC COMPANY, A CORPORATION OF NEW YORK.

PROCESS OF MAKING MOLDED ARTICLES.

No Drawing. Application filed April 14, 1925, Serial No. 23,140. Renewed July 26, 1926.

The present invention comprises an improved process of carrying out the manufacture of composite or molded articles with a resinous binder which is convertible during molding to a different chemical condition and which gives off volatile products as a result of this chemical transformation.

My invention is particularly applicable to the production of articles from mica flakes by the use of a binder of the class of the material herein called glyptal, and consisting of a resinous reaction product of glycerine and phthalic anhydride. It is the object of my invention to improve the homogeneity, mechanical strength and insulating properties of this class of materials.

When a chemical reaction occurs between a polyhydric alcohol such as a glycerine and a polybasic acid, such as phthalic anhydride, a fusible, soluble resinous material is first formed which, as described in Callahan Patents Nos. 1,108,329 and 1,108,330 of August 25, 1914, is converted by heating to a hard, horny infusible and insoluble material. The gradual conversion or curing of the resin from the fusible to the infusible state is accomplished by some evolution of gases and vapors, chiefly water vapor and uncombined phthalic anhydride. When a material of this class is used for the purpose of binding together flakes of mica, the vaporous by-products of the curing reaction cannot readily escape due to the impervious nature of mica. Prior to my invention plates of mica coated with glyptal have been heated in a press in order to initiate the curing or hardening of the present binder, the reaction being interrupted before the resin was completely cured in order to carry out some mechanical shaping operations, after which the curing was completed.

I have discovered that improved results can be obtained by carrying out the first part of the hardening reaction or polymerization of the resin under such conditions that the escape of the volatile by-products is facilitated. With this result in view, the first heat treatment of the composition to be molded, which in this case consists of mica coated with a resin binder of the glyptal class, is carried out in a vacuum in accordance with the preferred form of my invention, thereby not only eliminating whatever solvent remains in the glyptal but also causing the initial step of the curing of the resin to occur under conditions most favorable to the elimination of the volatile by-products. It is not always necessary to carry out the first step of the heat treatment of the material in a vacuum. The material may also be initially heated in desired assembled form in the open air. The further curing of the material at a higher temperature in a preferred form of my invention is carried out while an intermittent pressure is applied upon the material. The release of the pressure provides for the escape of gases.

The following specific procedure as applied to the manufacture of mica cones for the commutators of dynamo-electric machines will illustrate and explain the essential features of my invention.

Mica plates of the size and thickness heretofore used in the manufacture of composite mica articles are pasted together by known methods with a binder consisting of a solution of glyptal in acetone having a specific gravity of about 0.86. The built-up plates or sheets of mica thus produced are covered on both sides with dry mica to prevent sticking to the supports and are placed in an evacuated oven heated to a temperature of about 110° C. where the mass is allowed to remain for a length of time varying with conditions from about 30 minutes to about two hours. During this preliminary heating step the acetone solution is thoroughly removed and, as already explained above, some polymerization of the resin occurs. The plates are then placed between cushions in a hydraulic press as described in my prior Patent No. 1,098,967 of June 2, 1914, and after the temperature has become equalized by turning on the steam used for heating the press for about fifteen minutes, a pressure is exerted upon the mica of about 500 to 1,000 pounds per square inch of surface of the mica. The pressure of the steam in the heating coils of the press being maintained within the limits of about 80 to 100 pounds which corresponds to a temperature of about 160 to 170° centigrade. The hydraulic pressure should be released several times during the first five to ten minutes to allow the escape of volatile ingredients in the sheets. The escape of vapors is so vigorous that the hiss of escaping gas can be heard when the pressure is released. When after about ten minutes it appears that no more vapors are being given off, full pressure of about 1,000 pounds per square inch is applied to the mica sheets continuously for about 45 minutes.

The sheets thus produced are milled to equalize the thickness and thereafter the sheets are cut or sawed to produce developed shapes which can be later molded into cones or other desired articles.

After the developed shapes have been preformed they are placed in a mold, heated to approximately 250° centigrade and pressure is applied to give the articles the desired form. During this molding treatment of 250° centigrade which is continued for about ten to fifteen minutes the resin is carried very close to the final infusible state but the resin, even at the end of this time, is still capable when heated of yielding somewhat without actual fusion. This property of the resin of slightly softening at high temperature instead of remaining in a hard, brittle state is of particular advantage in the assembly of mica cones in commutators as it is impracticable to mechanically form the metal and mica parts of the commutator to exact dimensions. Hence when the cones are assembled with the other parts of the commutator and heated to a temperature of about 150 to 175° centigrade under pressure the binder will yield sufficiently to cause the mica to assume a snug mechanical fit with respect to the adjoining metal parts without cracking.

While I have described my invention with particular reference to which manufacture of mica parts with glyptal a condensation product of glycerine phthalic anhydride, I wish it to be understood that the product is applicable to other resins of the same class and I mean by the appended claims to include the application of my described process to resins containing other polybasic acids and other polyhydric alcohols. Composite bodies comprising mica and resins made from a polybasic acid and a polyhydric alcohol are described and claimed in Patent No. 1,589,094 issued on June 15, 1926 to L. E. Barringer and myself.

What I claim as new and desire to secure by Letters Patent of the United States, is:

1. The method of making laminated mica articles with a binder of the glyptal class which consists in heating in a vacuum mica laminations containing said binder at a temperature sufficiently high to cause partial polymerization of said binder and thereupon continuing the polymerization under pressure.

2. The method of making molded articles from materials coated with glyptal which consists in heating said materials under conditions permitting the escape therefrom of gases at low pressure, the temperature being chosen to cause partial curing of the glyptal, and thereafter continuing the curing under pressure at a higher temperature.

3. The method of making molded articles which consists in applying glyptal upon the surface of the materials to be molded, heating the coated materials in a vacuum at a temperature sufficiently high to begin curing of the glyptal and to eliminate solvent, continuing the curing at a higher temperature under intermittent pressure, fashioning the product to a preliminary form and continuing the curing while shaping the preliminary form under pressure.

4. The method of making molded articles comprising superimposed mica flakes which consists in applying a layer of glyptal in the fusible state to said flakes, heating under partial atmospheric pressure at a temperature sufficiently high to partially harden the glyptal, applying pressure intermittently at a higher temperature, mechanically shaping the blanks thus produced and continuing the hardening of the glyptal in the shaped articles at a still higher temperature while molding the same to a desired configuration.

5. The method of molding articles from mica plates which consists in applying a resin of the glyptal class to mica plates, heating the coated plates while assembled in desired relation to a temperature of about 110° centigrade in a vacuum, then heating to a temperature of about 160 to 170° centigrade, while applying an intermediate pressure to preform blanks from said materials and finally applying a molding pressure to the blanks at a temperature of about 250° centigrade.

6. The method of fabricating molded articles from particles of inert material which consists in applying a polyhydric alcohol-polybasic acid resin in the fusible state to said particles, producing blanks therefrom, heating said blanks at a temperature of about 110° C. in a vacuum for about ½ to 2 hours, further heating said blanks under a pressure of 80 to 100 pounds intermittently applied at a temperature of about 160 to 170° C., thereupon applying a higher pressure while heating to a higher temperature, fabricating said blanks into articles of desired shape and molding said articles at a still higher temperature.

7. The method of fabricating molded articles from particles of inert material with a binder comprising a polyhydric alcohol-polybasic acid resin which consists in applying said resin in the fusible state to the particles to be molded, partially polymerizing said binder under pressure conditions favorable to the escape of volatile material, continuing the polymerization of the binder at a higher temperature under pressure intermittently applied, and continuing the polymerization of the binder at a higher pressure until said resin is substantially infusible.

8. The method of fabricating mica articles which consists in associating mica flakes with a glyceryl phthalate resin in the fusible state, partially converting said resin to the infusible state in a vacuum, continuing the conversion at a higher temperature under intermittently applied pressure and thereafter carrying the conversion in a mold and under pressure close to the infusible state of said resin.

In witness whereof, I have hereunto set my hand this 10th day of April, 1925.

CHARLES F. PETERSON.